(12) United States Patent
Carpenter et al.

(10) Patent No.: US 7,315,875 B2
(45) Date of Patent: Jan. 1, 2008

(54) DATA FILTERING

(75) Inventors: Paul Matthew Carpenter, Cambridge (GB); Dominic Hugo Symes, Cambridge (GB)

(73) Assignee: ARM Limited, Cambridge (GB)

( * ) Notice: Subject to any disclaimer, the term of this patent is extended or adjusted under 35 U.S.C. 154(b) by 746 days.

(21) Appl. No.: 10/764,473

(22) Filed: Jan. 27, 2004

(65) Prior Publication Data

US 2004/0190634 A1 Sep. 30, 2004

(30) Foreign Application Priority Data

Mar. 27, 2003 (GB) ................................ 0307107.3

(51) Int. Cl.
*G06F 17/10* (2006.01)
(52) U.S. Cl. ..................................... 708/300
(58) Field of Classification Search ................. 708/300
See application file for complete search history.

(56) References Cited

U.S. PATENT DOCUMENTS 3,979,701 A 9/1976 Tomozawa 6,374,279 B1 * 4/2002 Young ......................... 708/319
2005/0223049 A1 * 10/2005 Regis .......................... 708/300

FOREIGN PATENT DOCUMENTS

| EP | 0 797 349 | 9/1997 |
| EP | 0 808 068 | 11/1997 |
| GB | 2 087 191 | 5/1982 |

* cited by examiner

*Primary Examiner*—D. H. Malzahn
(74) *Attorney, Agent, or Firm*—Nixon & Vanderhye P.C.

(57) ABSTRACT

A method, computer program product and data processing apparatus for filtering data, in particular for use in deblocking filters. The method comprising applying a plurality of m filter coefficients which each have a value which is a negative power of two and which sum to one, to a plurality of m input data items to produce a filtered output data item, by performing a sequence of averaging calculations comprising averaging input data items to which a smallest filter coefficient is to be applied to produce first averaged data and averaging the first averaged data with other averaged input data or with input data items to which larger filter coefficients are to be applied the plurality of m filter coefficients being applied to the plurality of m input data items via a sequence of averaging calculations such that a data width of any calculated data does not exceed that of the input data being averaged.

40 Claims, 3 Drawing Sheets

$$\begin{pmatrix} y_1 \\ y_2 \\ y_3 \\ y_4 \\ y_5 \\ y_6 \\ y_7 \\ y_8 \end{pmatrix} = \frac{1}{16} \begin{pmatrix} 6, & 4, & 2, & 2, & 1, & 1, & 0, & 0, & 0, & 0 \\ 4, & 2, & 4, & 2, & 2, & 1, & 1, & 0, & 0, & 0 \\ 2, & 2, & 2, & 4, & 2, & 2, & 1, & 1, & 0, & 0 \\ 1, & 1, & 2, & 2, & 4, & 2, & 2, & 1, & 1, & 0 \\ 0, & 1, & 1, & 2, & 2, & 4, & 2, & 2, & 1, & 1 \\ 0, & 0, & 1, & 1, & 2, & 2, & 4, & 2, & 2, & 2 \\ 0, & 0, & 0, & 1, & 1, & 2, & 2, & 4, & 2, & 4 \\ 0, & 0, & 0, & 0, & 1, & 1, & 2, & 2, & 4, & 6 \end{pmatrix} \begin{pmatrix} x_0 \\ x_1 \\ x_2 \\ x_3 \\ x_4 \\ x_5 \\ x_6 \\ x_7 \\ x_8 \\ x_9 \end{pmatrix}$$

$$y_5 = \frac{1}{2}\left(\frac{1}{2}\left[x_5 + \frac{(x_6+x_7)}{2}\right] + \frac{1}{2}\left(\frac{(x_3+x_4)}{2} + \frac{1}{2}\left[\frac{(x_8+x_9)}{2} + \frac{(x_1+x_2)}{2}\right]\right)\right)$$

$$y_5 = \frac{1}{2}\left(\frac{1}{2}\left[x_5 + \frac{(x_6+x_3)}{2}\right] + \frac{1}{2}\left(\frac{1}{2}\left[x_4 + \frac{(x_8+x_9)}{2}\right] + \frac{1}{2}\left[x_7 + \frac{(x_1+x_2)}{2}\right]\right)\right)$$

$$y_8 = \frac{1}{16}\left(x_4 + x_5 + 2x_6 + 2x_7 + 4x_8 + 6x_9\right)$$

$$= \frac{1}{16}\left(x_4 + x_5 + 2x_6 + 2x_7 + 4x_8 + 4x_9 + 2x_9\right)$$

$$y_8 = \frac{1}{2}\left(\frac{1}{2}\left[x_9 + \frac{(x_6+x_7)}{2}\right] + \frac{1}{2}\left(x_8 + \frac{1}{2}\left[x_9 + \frac{(x_4+x_5)}{2}\right]\right)\right)$$

DATA FILTERING

BACKGROUND OF THE INVENTION

1. Field of the Invention

The present invention relates to the field of data filtering and, in particular, in certain preferred embodiments to the field of deblocking filters in video decoders.

2. Description of the Prior Art

In the field of video decoders, for example, in MPEG decoders, it is known to use deblocking filters to improve the picture. This is particularly important in situations where there is a low bit rate, as for example, in the transmission of video data to a mobile telephone.

Deblocking filters consist of some decision logic, which is used to decide where the boundary of a block is to be found, i.e. to detect a horizontal and/or vertical line and then to decide whether the line is part of the picture or is merely the boundary of a block and as such should be removed. This decision logic is then followed by a low-pass filter that can be applied across the block boundaries.

An example of a deblocking filter which is used in the MPEG-4 standard is given below. The matrix notation of this filter is shown in FIG. 1.

The impulse response of the filter is:

(1,1,2,2,4,2,2,1,1)/16

When applied the filter operates on an input array of ten pixels (x0 to x9), and updates the middle eight pixels (y1 to y8). Whenever the filter would access pixels outside the input data, the value of the appropriate boundary pixel is substituted. A matrix notation of the filter is shown in FIG. 1. FIG. 1 shows the matrix notation of a low pass filter that acts as a deblocking filter in an MPEG decoder.

One drawback of applying this filter to the decoded data is that it is expensive to do, and in some implementations requires twice the number of cycles as the MPEG-4 decoder itself.

SUMMARY OF THE INVENTION

A first aspect of the present invention provides a method of filtering data comprising: applying a plurality of m filter coefficients which each have a value which is a negative power of two or is zero and which sum to one, to a plurality of m input data items to produce a filtered output data item, by performing a sequence of averaging calculations, comprising averaging input data items to each of which a smallest filter coefficient is to be applied to produce first averaged data and averaging said first averaged data with other averaged input data or with input data items to which larger filter coefficients are to be applied said plurality of m filter coefficients being applied to said plurality of m input data items via a sequence of averaging calculations such that data width of any calculated data does not exceed that of said input data being averaged.

The present invention recognises the properties of the filter coefficients, i.e. that they are generally negative powers of two and sum to one and uses these properties to combine the input data with the filtering coefficients by using a sequence of averaging calculations. The average of two numbers is the sum of the two numbers divided by two and thus filter coefficients that are a negative power of two can be applied to the input data by a suitable sequence of averaging operations. The advantage of manipulating the data using a series of averaging calculations is that the data width of an average of two numbers is never larger than the data width of the larger of the two numbers. Thus, if the input data were a series of 8-bit numbers the filter coefficients could be applied to the input data and a filtered output data item obtained without the need to use registers that are larger than 8-bits wide. This can significantly reduce the number of registers required to perform the filtering calculations and thus, can enable several calculations to be performed in parallel thereby significantly increasing the speed of calculation.

Although the averaging calculation can in some embodiments comprise averaging four or more data items to which a smallest filter coefficient is to be applied together, preferably, the sequence of averaging calculations comprises averaging two items of input data to which a smallest filter coefficient is to be applied to produce first averaged data and averaging the first averaged data with other first averaged data or with an input data item to which a filter coefficient that is twice as large as the smallest filter coefficient is to be applied.

In preferred embodiments, the sequence of averaging calculations further comprises successive further averagings, wherein averagings are performed between sets of input data, the sets of input data comprising averaged input data or individual input data items, averages only being performed between sets of input data where the sum of the filter coefficients to be applied to each set of input data are equal.

The sequence of averaging calculations are performed in a certain way so that the filter coefficients are appropriately applied to the input data. The rules for this are set out above and examples of averagings that follow these rules are given below and involve averages such as averaging a pair of averaged input data items to which a smaller coefficient is to be applied with an input data item to which a filter coefficient that is twice the value of the smaller coefficient is to be applied, or averaging two averaged pairs of input data items to which the smaller coefficient is to be applied either with an input data item to which a filter coefficient that is four times the value of the smaller coefficient is to be applied, or with an averaged pair of input data items to which the filter coefficient that is twice the value of the smaller coefficient is to be applied.

Although the filter coefficients may consist of a single row of coefficients to be applied to a plurality of input data items to produce a single output data item, in preferred embodiments it comprises repeatedly performing the steps of a first aspect of the present invention such that an array of m×n filter coefficients are applied to an array of m input data items to produce a plurality of n output data items.

In preferred embodiments, the step of performing a sequence of averaging calculations includes selecting the input data that is to be averaged in dependence upon the frequency that two pieces of input data have common filter coefficients applied to them, and where possible selecting to average two pieces of data that have common filter coefficients applied to them a plurality of times, such that the calculated average of the input data can be re-used.

The way that the calculations are performed means that the average of certain input data items may be used in calculations for different output data items where they have common filter coefficients applied to them. There is some choice in the data items that are to be averaged provided that certain rules are followed. Thus, a way to improve performance of the filter is to select data to be averaged in such a way that data items whose averages are required in several calculations are averaged and the results re-used.

In some embodiments the filter coefficients have the required properties of being a negative power of two and summing to one, whereas in others they may not. This does not, however, necessarily mean that embodiments of the invention cannot be used in such circumstances. In some embodiments the method comprises the further step of, prior to applying the plurality of filter coefficients to the input data, arranging the coefficients such that they all have values that are a negative power of two and they sum to one.

Preferably, the step of arranging the filter coefficients such that each coefficient has a value that is a negative power of two, comprises splitting any filter coefficient that does not have this property into a sum of components, each component having a value that is a negative power of two.

Thus, in the example given in the introduction for the MPEG-4 filter, the 6 s appearing in the corners of the filter coefficients can be divided into a 4+2, and then applied to the input data. The data can then be combined using appropriate averaging calculations.

Although the method can be applied to a plurality of different filters, it is particularly applicable to a situation where the filter coefficients relate to a low-pass filter, and preferably, a deblocking filter.

In preferred embodiments, the input data relates to an array of pixels. The filter of embodiments of the present invention is particularly good at filtering video data and can be used advantageously, in situations where the input data comprises an array of ten pixels, the filter coefficients being such that output data comprises an array of eight pixels. Thus, the filter acts on an input array of ten pixels, and updates the middle eight pixels.

A further aspect of the present invention provides, a computer program product for applying a plurality of m filter coefficients to a plurality of m input data items comprising: filtering logic operable to control a processor to combine filter coefficients which each have a value that is a negative power of two and that sum to one, with a plurality of m input data items to produce a filtered output data item, by controlling said processor to perform a sequence of averaging calculations, said sequence of averaging calculations comprising averaging input data items to which a smallest filter coefficient is to be applied to produce first averaged data and averaging said first averaged data with other averaged input data or with input data items to which larger filter coefficients are to be applied said plurality of m filter coefficients being applied to said plurality of m input data items via a sequence of averaging calculations such that a data width of any calculated data does not exceed that of said input data items.

Although the input data items can be of any size in some embodiments, they each comprise 8 bits. This makes them particularly adapted for handling by many conventional processors.

Although the filtering logic may comprise a number of different forms, in preferred embodiments it comprises a plurality of SIMD instructions. This form of instructions is particularly well adapted for handling these calculations.

The use of SIMD instructions for handling 8-bit pieces of data means that in some processors having 32 bit registers four pieces of input data can be handled in parallel. This increases the speed of processing of the calculations considerably.

Preferably, the filtering logic is operable to set the carry flag to indicate if the filtered output data is to be stored or discarded.

A property of embodiments of the present invention is that as the calculations performed are all averages, the carry flag is never needed, and it can therefore be used to indicate other things, such as whether data is to be stored or can be discarded. This can be particularly important in some embodiments, where the decision between filtering or not filtering is made for individual input data items that are being calculated in parallel and for which some results may need to be stored and some discarded.

A still further aspect of the present invention provides a data processing apparatus comprising a processor operable to filter input data, said data processing apparatus comprising: filtering logic operable to control said processor to apply a plurality of m filter coefficients which each have a value that is a negative power of two and which sum to one, to a plurality of m input data items to produce a filtered output data item, by controlling said processor to perform a sequence of averaging calculations said sequence of averaging calculations comprising averaging input data items to which a smallest filter coefficient is to be applied to produce first averaged data and averaging said first averaged data with other averaged input data or with input data items to which larger filter coefficients are to be applied, said plurality of m filter coefficients being applied to said plurality of m input data items via a sequence of averaging calculations, such that a data width of any calculated data does not exceed that of said input data.

The above, and other objects, features and advantages of this invention will be apparent from the following detailed description of illustrative embodiments that is to be read in connection with the accompanying drawings.

BRIEF DESCRIPTION OF THE DRAWINGS

FIG. 2 schematically shows a video picture that is formed from MPEG-4 encoded and then decoded data, prior to any deblocking. As can be seen it comprises blocks of data. A and B comprise lines of pixels which cross the block boundaries. It is these lines of pixels that need to be filtered by any deblocking filter to remove the "block" effect from the picture.

The deblocking filtering of any data occurs after the decoding. MPEG decoding involves feedback of some data and thus it is important that any calculations are accurate as errors can be magnified by the feedback process. The deblocking filtering occurs after the feedback loop and as such it is less important if the calculated data is not bit exact.

A deblocking filter consists of some decision logic, which is not relevant here, followed by a low-pass filter that is applied across the block boundaries (A and B).

It has been noticed that low pass filters used in deblocking generally have filter coefficients that are negative powers of two and that add to one. It was noticed that this property of the filter coefficients could be used to enable the output data to be calculated using a series of averaging operations. This would have the advantage that the working data is represented by a fixed number of bits throughout the calculation. It should be noted that calculating the output data in this way may not be completely bit exact as there will be some rounding of data at the various averaging stages. However, as noted above this is not important at this point in the process.

Figures 1, 2:
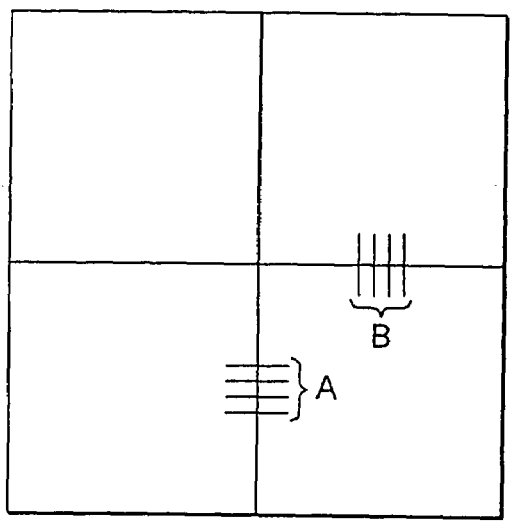
FIG. 1 shows the matrix notation of a known low pass filter which acts as a deblocking filter in an MPEG decoder.
FIG. 2 schematically shows the blocks on a decoded MPEG-4 video picture prior to deblocking filtering.
Figure 3A:
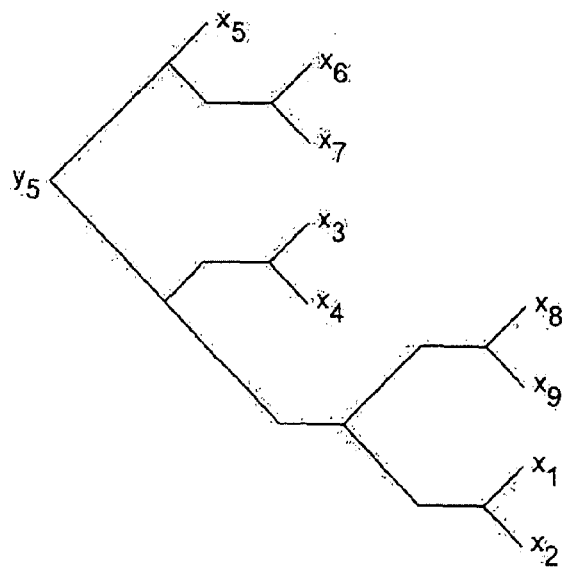
FIGS. 3A and 3B show a filtered pixel calculated as a sequence of averages of the input pixels.
Figure 3B:
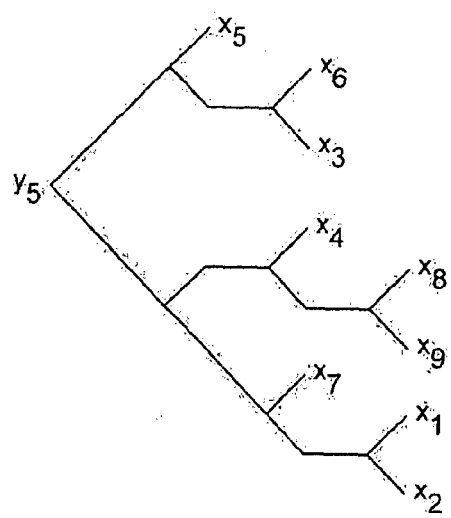

Using the example of the deblocking filter given in the introduction which operates on an input array of ten pixels and updates the middle eight pixels (see FIG. 1), y5 can be calculated as a sequence of averages as is shown in FIGS. 3A and 3B.

There are several possible ways of averaging the input data to calculate y5. FIG. 3A shows one possible way in which y5 can be calculated as a sequence of averages, while FIG. 3B shows another. These two possibilities are shown as a sequence of averaging operations using a tree representation. This procedure is very similar to building a Huffman tree. It should be noted at this point that the use of Huffman trees in regard to deblocking filters is not something that has been contemplated before, nor is it at all obvious to do so given the different field in which Huffman trees are generally used. For each row in the matrix an appropriate tree can be chosen.

As can be seen from FIGS. 3A and 3B, there are several possible ways that y5 can be calculated, each involving some difference in the input values that are being averaged. The possibility of averaging different input values and still arriving at the same answer enables one to choose different ways of performing the calculation. This enables input values that have the same filter coefficients applied to them in several different calculations to be chosen to be averaged together, so that this averaging result can be re-used in a later calculations. For example, the averaging of x6 and x7 could also be used in the calculation of y3 and y8. Similarly, x8 and x9 can also be used in the calculation of y6.

Thus, for each row in the matrix, an appropriate tree is chosen. The optimal choice of trees provides the greatest number of common sub expressions between the rows in the matrix, subject to the number of available CPU registers.

To aid in the formation of the trees, it is often possible to factorise the original filter into the product of filters with impulse response. The filter shown in FIG. 1 can be factorised into the product of two filters with impulse response (1, 1, 1, 0, 1)/4 and (1.0, 1, 1, 1)/4. This hints at the best tree composition but it can be improved upon.

It should be noted that the averagings are performed according to a Huffman tree distribution and this results in averages only being performed between sets of input data where the number of averaged input data items times the filter coefficient that is to be applied to them are equal. That is to say x8, x9, x1 and x2, each have filter coefficients of 1 applied to them so they are averaged first. If the average of all four is used, then these must be averaged either with a data input item having a filter coefficient of four applied to it (x5) or with the average of two data items having a filter coefficient of two applied to them (an average of two of x3, x4, x6 or x7) and so on.

Figure 4:
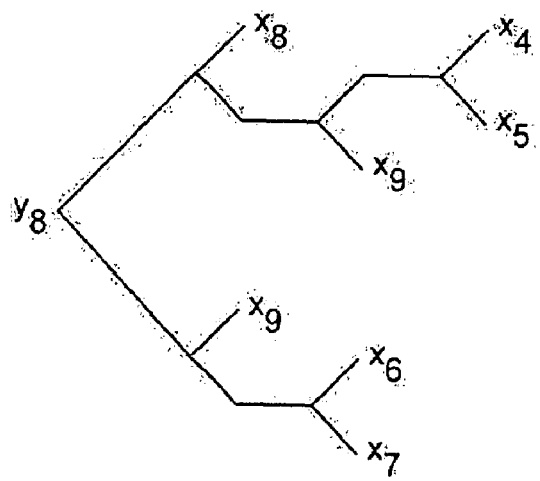
FIG. 4 shows the application of filter coefficients that are not initially negative powers of two.

As can be seen each data point is generally used exactly once. However, in some cases, a filter coefficient may not be a negative power of two. See for example, the 6 s in the corner of the matrix shown in FIG. 1. These are dealt with by splitting them into a sum of 2+4. This splitting of the coefficients is generally done by the programmer and not by the processor, although the processor could in some embodiments be programmed to perform such an operation. Thus, the amended split coefficients are input into the processor. FIG. 4 shows how this could be applied when calculating y8.

In an embodiment of the present invention, this idea can be implemented using the ARMv6 (Advanced RISC Machines of Cambridge England) 8-bit SIMD instructions. This means that the deblocking filter can be implemented in 8-bit SIMD, allowing four input values to be calculated in parallel. This gives a factor of two improvement in speed over 16-bit SIMD. This is very attractive given the fact that generally the deblocking filter is twice as expensive as the MPEG-4 decoder is.

A further advantage of embodiments of the present invention is that as the data width never increases throughout the calculation, the carry flags are never needed. These can therefore be used to carry other information. In a deblocking filter according to an embodiment of the present invention the decision between filtering and not filtering is made at each boundary pixel. As the implementation processes four pixels in parallel, not all of them may be required. Before writing the set of four pixels back to the frame buffer, the SEL instruction selects the appropriate combination of updated and/or original pixels. These are indicated by information held in the carry flags.

Although a particular embodiment of the invention has been described herein, it will be apparent that the invention is not limited thereto and that many modifications and additions may be made within the scope of the invention. For example, various combinations of the features of the independent claims could be made with the features of the dependent claims without departing from the scope of the present invention.

Although illustrative embodiments of the invention have been described in detail herein with reference to the accompanying drawings, it is to be understood that the invention in not limited to those precise embodiments, and that various changes and modifications can be effected therein by one skilled in the art without departing from the scope and spirit of the invention as defined by the appended claims.

We claim:

1. A method of filtering data including a computer readable storage medium comprising computer readable instructions implementing said method, said method comprising:
   applying a plurality of m filter coefficients which each have a value which is a negative power of two or is zero and which sum to one, to a plurality of m input data items to produce a filtered output data item, by performing a sequence of averaging calculations, said sequence of averaging calculations comprising:
   averaging input data items to each of which a smallest filter coefficient is to be applied to produce first averaged data; and
   averaging said first averaged data with other averaged input data or with input data items to which larger filter coefficients are to be applied, said plurality of m filter coefficients being applied to said plurality of m input data items via a sequence of averaging calculations such that a data width of any calculated data does not exceed that of said input data being averaged.

2. A method according to claim 1, wherein said sequence of averaging calculations comprises:
   averaging two items of input data to which a smallest filter coefficient is to be applied to produce first averaged data; and
   averaging said first averaged data with other first averaged data or with an input data item to which a filter coefficient that is twice as large as the smallest filter coefficient is to be applied.

3. A method according to claim 1, said sequence of averaging calculations further comprising successive further averagings, wherein averagings are performed between sets of input data, the sets of input data comprising averaged input data or individual input data items, averages only being performed between sets of input data where the sum of the filter coefficients to be applied to each set of input data are equal.

4. A method of filtering data according to claim 1, comprising repeatedly performing the method steps such that an array of m×n filter coefficients are applied to a plurality of m input data items to produce a plurality of n output data items.

5. A method according to claim 4, wherein said sequence of averaging calculations includes selecting the input data that is to be averaged in dependence upon the frequency that two pieces of input data have common filter coefficients applied to them, and where possible selecting to average two pieces of data that have common filter coefficients applied to them a plurality of times, such that the calculated average of the input data can be re-used.

6. A method according to claim 1, comprising the further step of, prior to applying said plurality of filter coefficients to said input data, arranging said coefficients such that they all have values that are a negative power of two and they sum to one.

7. A method according to claim 6, wherein said step of arranging said filter coefficients such that each coefficient has a value that is a negative power of two, comprises splitting any filter coefficient that does not have this property into a sum of components, each component having a value that is a negative power of two.

8. A method according to claim 1, wherein said filter coefficients relate to a low-pass filter.

9. A method according to claim 8, wherein said filter coefficients relate to a deblocking filter.

10. A method according to claim 1, wherein said input data relates to an array of pixels.

11. A method according to claim 10, wherein said input data comprises an array of ten pixels, said filter coefficients being such that output data comprises an array of eight pixels.

12. A computer program product comprising a computer readable storage medium containing computer readable instructions for a in a plurality of m filter coefficients to a plurality of m input data items, said computer program product comprising:
 filtering logic operable to control a processor to combine filter coefficients which each have a value that is a negative power of two and that sum to one, with a plurality of m input data items to produce a filtered output data item, by controlling said processor to perform a sequence of averaging calculations, said sequence of averaging calculations comprising:
 averaging input data items to which a smallest filter coefficient is to be applied to produce first averaged data; and
 averaging said first averaged data with other averaged input data or with input data items to which larger filter coefficients are to be applied said plurality of m filter coefficients being applied to said plurality of m input data items via a sequence of averaging calculations such that a data width of any calculated data does not exceed that of said input data items.

13. A computer program product according to claim 12, wherein said sequence of averaging calculations comprises:
 averaging two items of input data to which a smallest filter coefficient is to be applied to produce first averaged data; and
 averaging said first averaged data with other first averaged data or with an input data item to which a filter coefficient that is twice as large as said smallest filter coefficient is to be applied.

14. A computer program product according to claim 12, said sequence of averaging calculations further comprising successive further averagings, wherein averagings are performed between sets of input data, said sets of input data comprising averaged input data or individual input data items, averages only being performed between sets of input data where the sum of the filter coefficients to be applied to each set of input data are equal.

15. A computer program product of filtering data according to claim 12, wherein said filtering logic is operable to control said processor to repeatedly perform said sequence of averaging calculations such that an array of m×n filter coefficients are applied to a plurality of m input data items to produce a plurality of n output data items.

16. A computer program product according to claim 15, wherein said filtering logic is further operable to control a processor to select pairs of input data items that are to be averaged in dependence upon the frequency that said pairs of input data items have common filter coefficients applied to them, such that where possible two input data items that have common filter coefficients applied to them a plurality of times are selected, such that a calculated average of the input data can be re-used.

17. A computer program product according to claim 12, further comprising:
 coefficient arranging logic arranged prior to said filtering logic and operable to control a processor to arrange said filter coefficients such that each coefficient has a value that is a negative power of two and the coefficients sum to one.

18. A computer program product according to claim 17, wherein said coefficient arranging logic is operable to control a processor to split any filter coefficient that does not have a value that is a negative power of two into a sum of components, each component having a value that is a negative power of two.

19. A computer program product according to claim 12, wherein said filtering logic comprises a low-pass filter.

20. A computer program product according to claim 19, wherein said low-pass filter comprises a deblocking filter.

21. A computer program product according to claim 12, wherein said input data relates to an array of pixels.

22. A computer program product according to claim 21, wherein said input data comprises an array of ten pixels, said filter coefficients being such that filtered data comprises an array of eight pixels.

23. A computer program product according to claim 12, wherein said input data items each comprise 8 bits.

24. A computer program product according to claim 12, wherein said filtering logic comprises a plurality of SIMD instructions.

25. A computer program product according to claim 24 when dependent on claim 23, wherein said filtering logic is operable to process four input data items in parallel.

26. A computer program product according to claim 24, wherein said filtering logic is operable to set the carry flag to indicate if said filtered output data is to be stored or discarded.

27. A data processing apparatus comprising a processor including a computer readable storage medium, said processor for filtering input data, said data processing apparatus comprising:
 filtering logic for controlling the processor to apply a plurality of m filter coefficients which each have a value that is a negative power of two and which sum to one, to a plurality of m input data items to produce a filtered output data item, by controlling said processor to perform a sequence of averaging calculations, said sequence of averaging calculations comprising:

averaging input data items to which a smallest filter coefficient is to be applied to produce first averaged data; and averaging said first averaged data with other averaged input data or with input data items to which larger filter coefficients are to be applied said plurality of m filter coefficients being applied to said plurality of m input data items via a sequence of averaging calculations, such that a data width of any calculated data does not exceed that of said input data.

28. A data processing apparatus according to claim 27, wherein said sequence of averaging calculations comprises:

averaging two items of input data to which a smallest filter coefficient is to be applied to produce first averaged data; and averaging said first averaged data with other first averaged data or with an input data item to which a filter coefficient that is twice as large as said smallest filter coefficient is to be applied.

29. A data processing apparatus according to claim 27, said sequence of averaging calculations further comprising successive further averagings, wherein averagings are performed between sets of input data, said sets of input data comprising averaged input data or individual input data items, averages only being performed between sets of input data where the sum of the filter coefficients to be applied to each set of input data are equal.

30. A data processing apparatus according to claim 27, wherein said filtering logic is operable to control said processor to repeatedly perform said sequence of averaging calculations such that an array of m×n filter coefficients are applied to a plurality of m input data items to produce a plurality of n output data items.

31. A data processing apparatus according to claim 30, wherein said filtering logic is further operable to control said processor to select said input data that is to be averaged in dependence upon the frequency that two pieces of input data have common filter coefficients applied to them, and where possible to select to average two pieces of data that have common filter coefficients applied to them a plurality of times, such that the calculated average of the input data can be re-used.

32. A data processing apparatus according to claim 27, further comprising coefficient arranging logic, said coefficient arranging logic being operable before said filtering logic to control said processor to arrange said filter coefficients such that each coefficient has a value that is a negative power of two and said coefficients sum to one.

33. A data processing apparatus according to claim 32, wherein said coefficient arranging logic is operable to control a processor to split any filter coefficient that does not have a value that is a negative power of two into a sum of components, each component having a value that is a negative power of two.

34. A data processing apparatus according to claim 27, wherein said filtering logic comprises a low-pass filter.

35. A data processing apparatus according to claim 27, wherein said input data relates to an array of pixels.

36. A data processing apparatus according to claim 35, wherein said input data comprises an array often pixels, said filter coefficients being such that filtered data comprises an array of eight pixels.

37. A data processing apparatus according to claims 27, wherein said input data items each comprise 8 bits.

38. A data processing apparatus according to claim 27, wherein said filtering logic comprises a plurality of SIMD instructions.

39. A data processing apparatus according to claim 38 when dependent on claim 37, wherein said processor comprises 32 bit registers which are operable to process four input data items in parallel.

40. A data processing apparatus according to claim 38, said processor further comprising at least one carry flag, said filtering logic being operable to set said carry flag to indicate if filtered output data is to be stored or discarded.

* * * * *